(12) United States Patent
Zhang et al.

(10) Patent No.: US 12,724,627 B2
(45) Date of Patent: Sep. 1, 2026

(54) MESSAGE NOTIFICATION METHOD AND APPARATUS

(71) Applicant: Huawei Technologies Co., Ltd., Shenzhen (CN)

(72) Inventors: Haidong Zhang, Shenzhen (CN); Rong Wang, Shenzhen (CN); Jie Li, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 253 days.

(21) Appl. No.: 18/619,943

(22) Filed: Mar. 28, 2024

(65) Prior Publication Data

US 2024/0241737 A1 Jul. 18, 2024

Related U.S. Application Data

(63) Continuation of application No. PCT/CN2022/119528, filed on Sep. 19, 2022.

(30) Foreign Application Priority Data

Sep. 30, 2021 (CN) ......................... 202111166675.X

(51) Int. Cl.
*G06F 9/451* (2018.01)

(52) U.S. Cl.
CPC .................................... *G06F 9/451* (2018.02)

(58) Field of Classification Search
CPC ................. G06F 9/451; G06F 9/45558; G06F 2009/45562; G06F 9/542; G06F 9/54; G06F 3/04817
See application file for complete search history.

(56) References Cited

U.S. PATENT DOCUMENTS

2009/0249247 A1* 10/2009 Tseng ...................... H04W 4/50 715/835
2013/0145278 A1* 6/2013 Newell ................. G06F 3/0484 715/738

FOREIGN PATENT DOCUMENTS

EP 3835932 A1 6/2021

* cited by examiner

*Primary Examiner* — Cao H Nguyen
(74) *Attorney, Agent, or Firm* — Conley Rose, P.C.

(57) ABSTRACT

A message notification method comprises obtaining, by an ANDROID operating system (OS) running in an ANDROID container, a notification message by monitoring a message processing process of an ANDROID application, sending the notification message to a processor, determining, by the processor and based on an application window associated with the ANDROID application in the notification message, a state of the application window, and displaying in a corresponding manner based on different states of the application window.

20 Claims, 5 Drawing Sheets

600
Start
601
Is an Android application started?
No
Yes
602
Do not display a display picture
603
Is an application window minimized?
No
Yes
604
Display a display picture on which a notification message is rendered
605
Make a prompting mark on an icon on a taskbar based on indication information

MESSAGE NOTIFICATION METHOD AND APPARATUS

CROSS-REFERENCE TO RELATED APPLICATIONS

This is a continuation application of International Patent Application No. PCT/CN2022/119528, filed on Sep. 19, 2022, which claims priority to Chinese Patent application No. 202111166675.X, filed on Sep. 30, 2021. The disclosures of the aforementioned applications are hereby incorporated by reference in their entireties.

TECHNICAL FIELD

This application relates to the field of computer technologies, and in particular, to a message notification method and apparatus.

BACKGROUND

The ANDROID operating system has been widely used in various intelligent devices such as terminals, vehicle-mounted control systems, and the like by virtue of convenience and compatibility of open-source solutions and application development. With continuous expansion and extension of application scenarios of the ANDROID operating system, an operating system of a personal computer (PC) may also run various ANDROID application programs based on an ANDROID container in a virtualized form. For example, the ANDROID container may run ANDROID applications such as social applications, shopping applications, or the like. This expands a work/entertainment application ecosystem on the PC. In this case, the ANDROID operating system collaborates with an application window on the PC through cross-process communication, to use an ANDROID application program in a manner similar to using a PC desktop application. For example, a plurality of ANDROID application programs may be started by using a mouse to double-click icons, and a window of each ANDROID application program may be freely opened/closed/moved/minimized/maximized.

However, a notification message of an existing ANDROID application function program is notified only to an ANDROID container, and the ANDROID container runs on a PC operating system. When receiving the notification message, the ANDROID container does not present the notification message to a user. Consequently, the user cannot learn of the notification message of the ANDROID application program. This affects user experience. In this case, how to improve a message notification method of the ANDROID application program is an urgent technical problem to be resolved.

SUMMARY

This application provides a message notification method and apparatus, to improve user experience.

According to a first aspect, a message notification method is provided. The method is performed by a processor of a computer device. The method includes: obtaining a notification message, where the notification message is obtained by an ANDROID operating system monitoring a message processing process of an application program, the ANDROID operating system runs in an ANDROID container, the ANDROID container is deployed in the computer device, and the ANDROID application is any application program running in the ANDROID operating system; determining, based on the notification message, a state of an application window associated with the ANDROID application; and displaying the notification message based on the state of the application window.

It can be learned from the foregoing descriptions that, when generating the notification, the ANDROID application in the ANDROID operating system may send the notification to the ANDROID system. The ANDROID operating system in the ANDROID container may monitor a notification sent outside by the ANDROID application, intercept the notification as a notification message, and send the notification message to the processor. The processor may determine, based on a package name of the ANDROID application in the notification message, an application window corresponding to the package name, check a state of the application window on a display interface, and display in a corresponding manner based on different states of the application window. This can meet a manner in which a user obtains the notification message in different states of the application window. Therefore, user experience is improved.

In a possible implementation, the displaying the notification message based on the state of the application window includes: displaying the notification message in the application window when the application window is in a display state.

In the foregoing possible implementation, when the ANDROID application indicated by the package name is in a started state, and the application window on the display interface is in the display state, the processor may directly display the notification message in the application window, for example, directly display the notification message above an upper part of the application window, so that the user can know the notification message in time.

In a possible implementation, the method further includes: making a prompting mark on an icon of the ANDROID application on a taskbar when the application window is in a minimized state.

In the foregoing possible implementation, when the ANDROID application indicated by the package name is in a started state, the application window on the display interface is in the minimized state, and a user cannot see the application window, the processor may first determine a location of the icon of the ANDROID application on the taskbar, and then make the prompting mark on the icon. Therefore, the user can notice the prompting mark and open the application window by clicking the icon. The processor may continue to display the notification message in the application window, so that the user can more quickly learn of the notification message.

In a possible implementation, after the making a prompting mark on an icon of the ANDROID application on a taskbar, the method further includes: prompting, in a pop-up window on the display interface, that there is the notification message.

In the foregoing possible implementation, after making the prompting mark on the icon on the taskbar, the processor may further display the pop-up window in a corner or an upper part of the display interface, to prompt the user that there is the notification message, so that the user can more quickly discover the notification message.

In a possible implementation, the notification message is a message that experiences data filtering in the ANDROID container.

In the foregoing possible implementation, the ANDROID container may further pre-process the notification message, to filter out data that is not needed by the processor. This reduces resources needed by the processor to process the notification message.

In a possible implementation, the method further includes: receiving a display picture from the ANDROID container, where the notification message is rendered on the display picture; and displaying the display picture when the application window is in the display state.

In the foregoing possible implementation, after monitoring the notification sent outside by the ANDROID application and intercepting the notification as the notification message, the ANDROID operating system may not need to send the notification message to the processor, but directly render the notification message on the display picture of the corresponding ANDROID application, and then send the display picture on which the notification message is rendered to the processor. In other words, the processor directly includes the notification message in the application window displayed on the display interface. This improves user experience.

In a possible implementation, the method further includes: making the prompting mark on the icon of the ANDROID application on the taskbar based on indication information when the application window is in the minimized state. The indication information is determined by the ANDROID operating system based on the state of the application window. The indication information indicates that there is the notification message in the ANDROID application.

In the foregoing possible implementation, when determining, based on a state table of the ANDROID application, that the application window corresponding to the notification message is in the minimized state, the ANDROID operating system may further send the indication information to the processor. The processor may determine, based on a package name in the indication information, a location of an icon of the corresponding ANDROID application on the taskbar, and make the prompting mark. The state table of the ANDROID application is maintained by the ANDROID operating system based on the state of the application window sent by the processor. In this solution, the user can more quickly discover the notification message.

According to a second aspect, a message notification apparatus is provided, and can implement the method according to any one of the first aspect or the possible implementations of the first aspect. The apparatus includes a corresponding unit or module configured to perform the foregoing method. The unit or module included in the apparatus may be implemented by software and/or hardware. The apparatus may be, for example, a network device, may be a chip, a chip system, a processor, or the like that supports the network device in implementing the foregoing method, or may be a logical module or software that can implement all or some functions of the network device.

According to a third aspect, a computer device is provided. The computer device includes a processor. The processor is coupled to a memory. The memory is configured to store instructions. When the instructions are executed by the processor, the computer device is enabled to implement the method according to any one of the first aspect or the possible implementations of the first aspect. The computer device may be, for example, a network device, or may be a chip, a chip system, or the like that supports the network device in implementing the foregoing method.

According to a fourth aspect, a computer-readable storage medium is provided. The computer-readable storage medium stores instructions. When the instructions are executed, a computer is enabled to perform the method according to any one of the first aspect or the possible implementations of the first aspect.

According to a fifth aspect, a computer program product is provided. The computer program product includes computer program code. When the computer program code is executed, the computer is enabled to perform the method according to any one of the first aspect or the possible implementations of the first aspect.

In this application, based on the implementations according to the foregoing aspects, the implementations may be combined to provide more implementations.

DESCRIPTION OF EMBODIMENTS

For ease of understanding, some concepts in embodiments of this application are first explained and described.

The ANDROID operating system, also referred to as ANDROID hereinafter, is a free and open-source operating system based on Linux kernel, and is mainly applicable to mobile devices such as smartphones, tablet computers, and the like.

A notification, also referred to as a notification message or message, is a message displayed by ANDROID outside a display picture sent by an ANDROID application to a processor, and intended to provide messages for users. Types of the messages include prompts, communication information from others, or real-time information in applications.

A hook is implemented by making a hook function. The hook function can capture events that occur in an ANDROID operating system process.

An ANDROID container is an ANDROID virtualization solution. The ANDROID container is deployed in a computer device, and runs depending on an operating system of the computer device. The ANDROID container is a container for running the ANDROID operating system. One or more ANDROID applications, for example, a social ANDROID application, a shopping ANDROID application, or the like may run on the ANDROID container.

The following describes in detail a first message notification method provided in this application with reference to the accompanying drawings.

Figure 1:
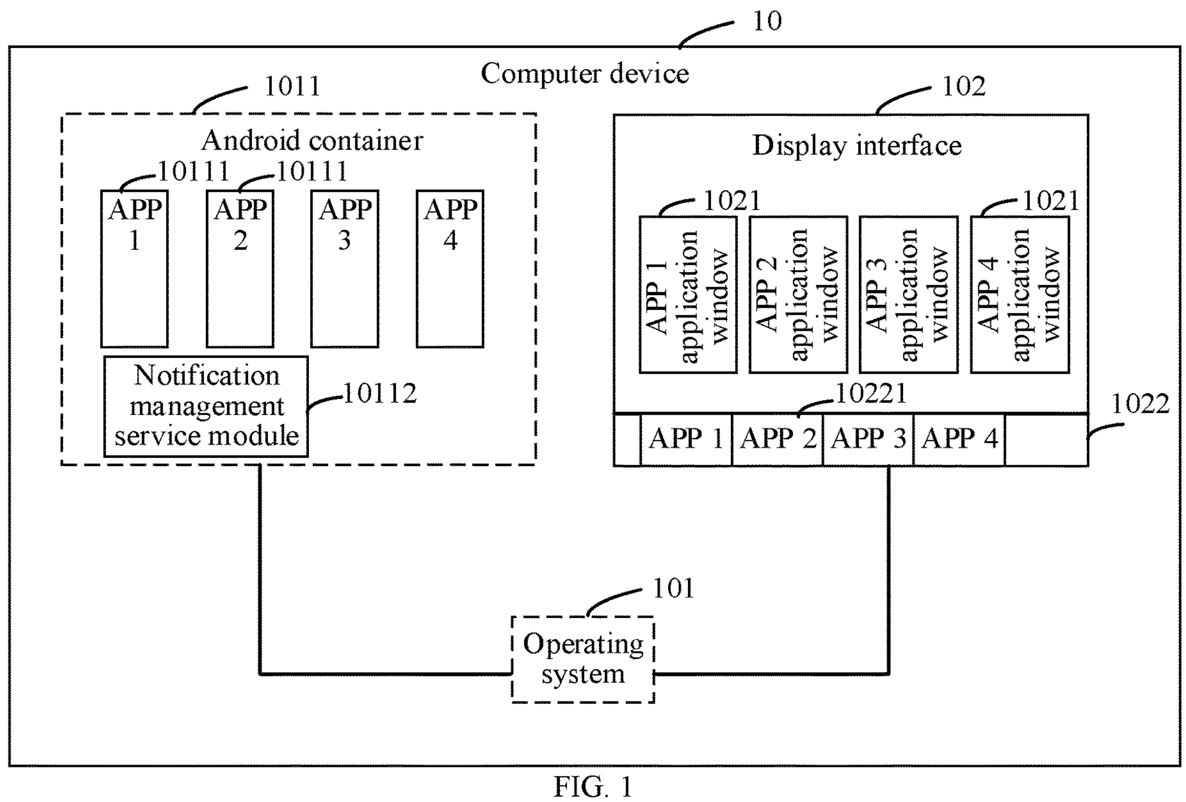
FIG. 1 is a diagram of a system architecture according to an embodiment of this application.

FIG. 1 is a diagram of a system architecture of a computer device 10 according to this application. As shown in the figure, the computer device 10 includes a processor (not shown in the figure). A PC operating system 101 runs on the processor. Optionally, the computer device 10 further includes a display interface 102. An ANDROID container 1011 runs in the PC operating system 101, and application windows 1021 are provided for user interaction on the display interface 102. An ANDROID operating system runs in the ANDROID container 1011. The ANDROID operating system may run a plurality of ANDROID applications (APPs) 10111 and a notification management service module 10112. For example, there are four APPs, including an APP 1, an APP 2, an APP 3, and an APP 4. A notification generated by each APP is sent to the notification management service module. A display picture of each started APP may be sent to the PC operating system 101. Correspondingly, the PC operating system 101 may display the display picture of the corresponding APP on an application window 1021 corresponding to each APP. The display interface is provided by a display of the computer device. The PC operating system 101 may further display icons 10221 of started APPs on a taskbar 1022 of the display interface.

In embodiments of this application, an ANDROID operating system may monitor a notification message generated and sent outside by an ANDROID application in the ANDROID operating system, and intercept the notification message to send the notification message to a processor. The processor may display the notification message in different notification manners based on a state of an application window of the ANDROID application corresponding to the notification message on the display interface.

The following describes in detail a message notification method provided in this application with reference to the accompanying drawings.

Figure 2:
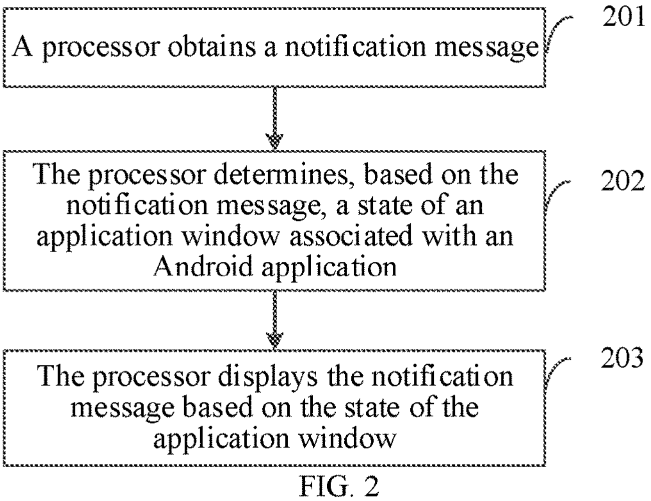
FIG. 2 is a schematic diagram of a message notification method according to an embodiment of this application.

FIG. 2 is a schematic diagram of a message notification method according to an embodiment of this application. As shown in the figure, the method includes the following steps:

Step 201: A processor obtains a notification message.

In this embodiment, an ANDROID operating system may monitor, by using an interception function, a notification message generated by an ANDROID application, and then forward the monitored notification message to the processor. For example, when an ANDROID application in the ANDROID operating system generates a notification message or the ANDROID operating system generates a notification message, the notification message may be sent to a notification management service module in an ANDROID container. In this embodiment of this application, the interception function may be inserted into the notification management service module to intercept the notification message, and the notification message is sent to the processor. The interception function may be a hook function. The hook function may monitor all messages received by the notification management service module. Because the notification management service module receives only the notification message from the ANDROID application, the notification management service module may monitor all received notification messages. In other words, each time a notification message is received, a process for processing the notification message may be forcibly stopped, and the notification message is intercepted and sent to the processor outside the ANDROID container.

In an example, the hook function may serialize the notification message, for example, convert state information of the notification message to be in a form that can be transmitted or received, for example, convert a message of a data type into a byte stream represented by an ordered byte (where for a PC device, the message may be serialized by converting into a binary stream). Then, the byte stream is transferred to the processor through a communication channel (a socket/a shared memory/a drive node, or the like). After receiving serialized notification message, the processor may reconstruct a data object from the ordered byte stream by using a deserialization operation, to restore the serialized notification message to the needed notification message.

In this embodiment, before the notification message is sent to the processor outside the ANDROID container, the hook function may further perform data filtering on the notification message. For example, the hook function may filter out data that is in the notification message and that does not need to be displayed on the display interface by the processor. For example, for the notification message in this embodiment of this application, only information about fields such as a package name, a title, a text, an icon, and time of the ANDROID application may be retained. A background image in the notification message may be removed, and a background image provided by the processor is used. Alternatively, a voice stream of the notification message in an ANDROID system is in an ANDROID format. In this embodiment of this application, voice information in the notification message may be extracted and sent to the processor, and the processor implements voice playback.

Step 202: The processor determines, based on the notification message, a state of an application window associated with the ANDROID application.

In this embodiment, each notification message includes a package name of the ANDROID application that generates the notification message. The processor may analyze the obtained notification message, and extract information in a field that stores the package name of the ANDROID application in the notification message, to obtain the package name of the ANDROID application. The processor may determine a corresponding ANDROID application based on the package name in the notification message, and then determine a state of an application window of the ANDROID application on the display interface. For example, the processor may query an application window running state table. The running state table is maintained by the processor. The processor may monitor a state of each application window, and form the running state table in combination with a package name of the application window. The processor may perform matching based on the package name, to obtain the state of the application window of the ANDROID application on the display interface.

Step 203: The processor displays the notification message based on the state of the application window.

In this embodiment, each ANDROID application running in the ANDROID container has an application state. The application state includes a started state or a closed state. Each ANDROID application also has a state of an application window on the display interface. The state of the application window includes a closed state, a display state, or a minimized state. When the application state is the closed state, the application window on the display interface is correspondingly in the closed state. When the application state is the started state, the application window on the display interface is correspondingly in the display or minimized state. When the application window is in the minimized state, only an icon of the ANDROID application on a taskbar is displayed on the display interface. When the ANDROID application generates the notification message, the ANDROID application is in the started state. When the notification message is transmitted to a PC processor, the application window of the ANDROID application on the display interface may alternatively be just closed, in other words, in this case, the application window may alternatively in the closed state. This is not limited herein.

The processor may determine, based on the state of the application window of the ANDROID application on the display interface, to prompt a user to check the notification message on the display interface, or display the notification message in the application window.

In an example, when the application window of the ANDROID application on the display interface is in the closed state, the processor does not need to display the notification message on the display interface.

When the application window of the ANDROID application on the display interface is in the minimized state, the processor may determine, based on a correspondence between the package name and the icon that are of the ANDROID application, a location of the icon of the ANDROID application on the taskbar, and make a prompting mark on the icon. The prompting mark includes highlighting or blinking on the icon, or adding a system prompt tone based on the highlighting or blinking. This is not limited herein. Optionally, the processor may further prompt, in a pop-up window on the display interface, the user to check the notification message. The pop-up window is displayed at an edge location of the display interface (a corner or a top part) for prompting that there is the notification message. For example, the pop-up window may be in a lower right corner for prompting the user. The user may open the application window by clicking the pop-up window or the icon having the prompting mark.

When a window of the ANDROID application is in an expanded state, the processor may directly display the notification message in the pop-up window at any location (for example, a window header) in the application window, or may display the notification message right above the application window, to avoid blocking a normal display picture in the application window.

FIG. 2 shows that the processor may display the notification message based on the state of the application window. For a process of determining different states of an application window by a processor, refer to a notification flowchart of a notification message shown in FIG. 3. Step 300 is a start step. Step 301: A processor determines whether an ANDROID application is in a started state. If the ANDROID application is in the started state, step 303 is performed. If the ANDROID application is not started, step 302 is performed. Step 302: The processor does not display a notification message on a display interface. Step 303: The processor determines whether an application window on the display interface is in a minimized state. If the application window is not in the minimized state, step 304 is performed. If the application window is in the minimized state, step 305 is performed. Step 304: The processor displays the notification message in the application window on the display interface. Step 305: The processor makes a prompting mark on an icon of the ANDROID application on a taskbar of the display interface. Step 306: The processor may prompt, in a pop-up window at a corner of the display interface or in a top part of the display interface, that there is the notification message.

In this embodiment of this application, the ANDROID container intercepts the notification message of the ANDROID application in the ANDROID operating system, and sends the notification message to the processor. The processor may display in a corresponding manner based on different states of the application window of the ANDROID application corresponding to the notification message on the display interface, to meet user experience of obtaining the notification message in different states of the application window.

The foregoing describes a process in which the processor performs matching on the corresponding notification message for each ANDROID application. In a possible implementation, in embodiments of this application, the ANDROID container may directly perform matching on a corresponding notification message for each ANDROID application.

Figure 4:
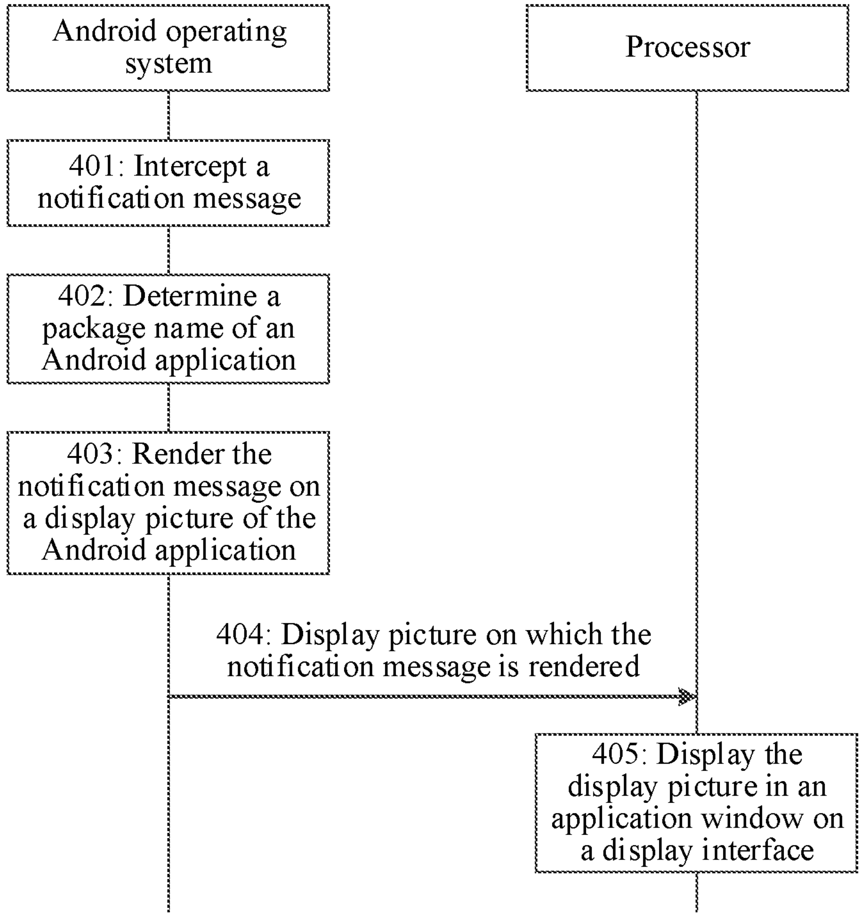
FIG. 4 is a schematic diagram of another message notification method according to an embodiment of this application.

FIG. 4 is a schematic diagram of another message notification method according to an embodiment of this application. The method includes the following steps.

Step 401: An ANDROID operating system intercepts a notification message.

Figures 5, 6:
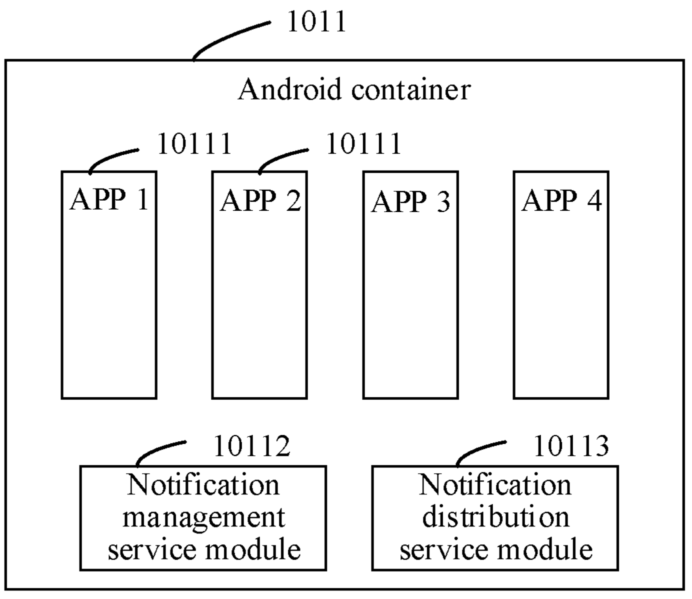
FIG. 5 is a schematic diagram of an ANDROID container according to an embodiment of this application.
FIG. 6 is a schematic diagram of a notification manner of a display picture on which a notification message is rendered according to an embodiment of this application.

In this embodiment, an ANDROID operating system may monitor, by using an interception function, a notification message generated by an ANDROID application, and then forward the monitored notification message to a processor. For example, in this embodiment of this application, a notification distribution service module, for example, a notification distribution service module 10113 in a schematic diagram of an ANDROID container shown in FIG. 5, may be added to an ANDROID container. When an ANDROID application in the ANDROID operating system generates a notification message or the ANDROID operating system generates a notification message, the notification message is sent to a notification management service module 10112 in the ANDROID container. In this embodiment of this application, an interception function, for example, a hook function, inserted into the notification management service module 10112 may monitor all messages received by the notification management service module. In other words, each time a notification message is received, a process for processing the notification message may be forcibly stopped, and the notification message is intercepted and sent to the notification distribution service module.

Step 402: The ANDROID operating system determines a package name of the ANDROID application based on the notification message.

In this embodiment, the ANDROID operating system may analyze the intercepted notification message, and extract a package name field in the notification message to obtain the package name of the ANDROID application. For example, in this application, the notification distribution service module analyzes the notification message from the notification management service module, and extracts the package name of the ANDROID application in the notification message.

Step 403: The ANDROID operating system renders the notification message on a display picture of the ANDROID application indicated by the package name.

In this embodiment, the ANDROID operating system may determine, based on the package name determined in step 402, the ANDROID application corresponding to the notification message, and distribute the notification message to the corresponding ANDROID application. The ANDROID operating system indicates the ANDROID application to render the notification message on the display picture. In this embodiment, the notification distribution service module determines the corresponding ANDROID application based on the package name, and then distributes the notification message to the ANDROID application corresponding to the package name. The notification message may further carry indication information. The indication information may indicate the ANDROID application to render the notification message on the display picture sent to the processor.

Step 404: The ANDROID operating system sends, to the processor, the display picture on which the notification message is rendered, and correspondingly, the processor receives the rendered display picture.

In this embodiment, when rendering the notification message on the display picture, the ANDROID application may transmit the display picture to the processor via the ANDROID operating system, and the processor normally receives the display picture from the ANDROID application. The processor does not need to sense whether the notification message is rendered on the display picture.

Step 405: The processor displays the display picture in an application window.

In this embodiment, when the processor receives the rendered display picture, for the display picture on which the notification message is rendered or a display picture on which no notification message is rendered, the processor directly displays the received display picture in a corresponding application window.

When the window of the ANDROID application corresponding to the package name on the display interface is in a minimized state, the ANDROID operating system sends the indication information to the processor. In an example, the user may also minimize the application window on the display interface. When detecting that the application window is in the minimized state, the processor may send the state of the application window to the ANDROID operating system. The ANDROID operating system may maintain an application state table. The application state table indicates a state of each ANDROID application on the display interface. If detecting that the application window of the ANDROID application is in the minimized state, the ANDROID operating system may send the indication information to the processor.

Optionally, the processor makes, based on the indication information, a prompting mark on an icon of the ANDROID application indicated by the package name on a taskbar. In an example, the indication information may include the package name of the ANDROID application. The processor may determine, based on the indication information, that the prompting mark needs to be made on the icon of the ANDROID application indicated by the package name on the taskbar, then determine, based on the package name, a location of the icon of the ANDROID application indicated by the package name on the taskbar, and highlight or blink the icon.

Figure 3:
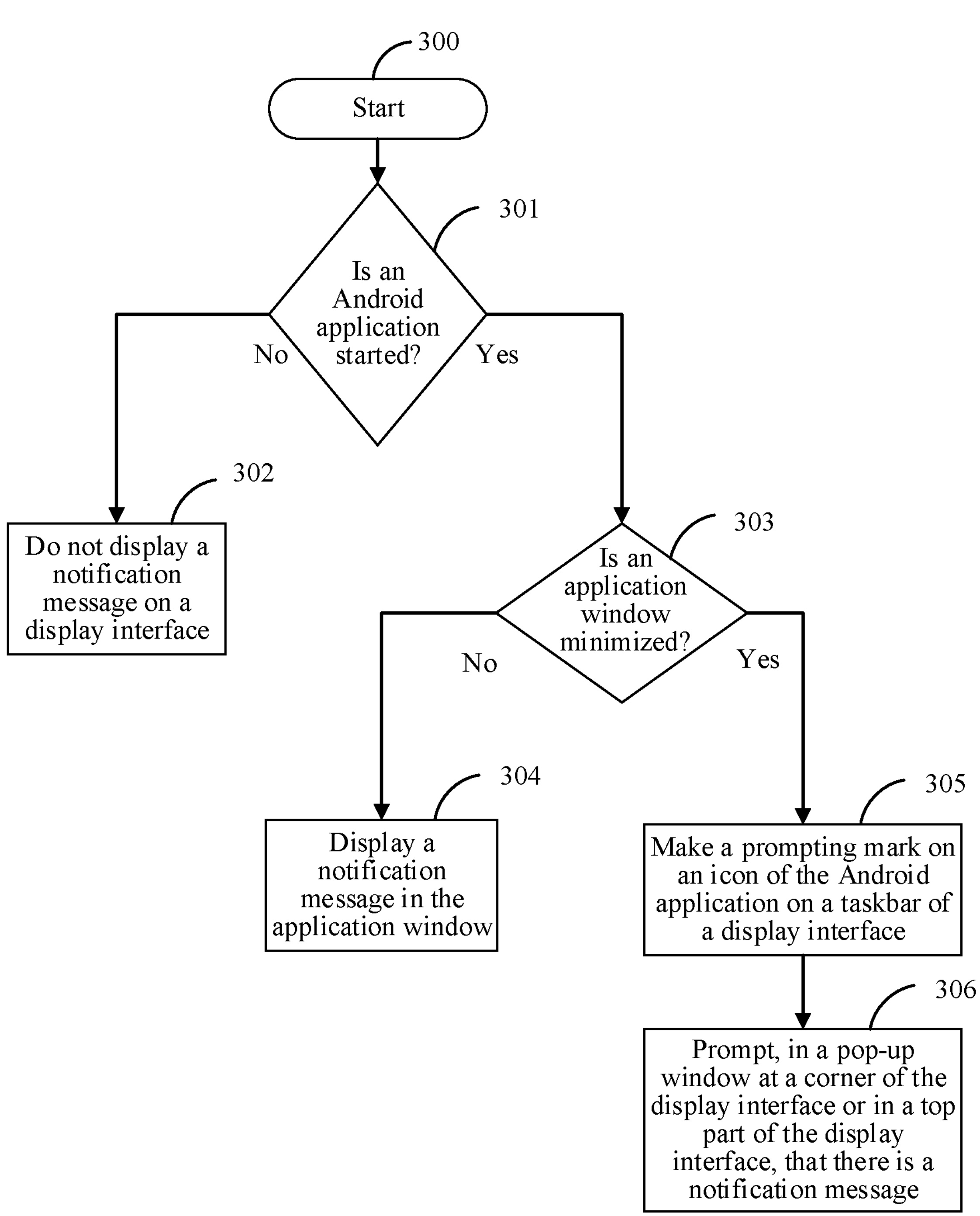
FIG. 3 is a notification flowchart of a notification message according to an embodiment of this application.

In FIG. 3, the processor determines how to display the notification message based on the state of the application window of the ANDROID application corresponding to the package name in the notification message on the display interface. In this application, the ANDROID operating system directly renders the notification message on the display picture. For a manner in which the processor displaying, on the display interface, the display picture on which the notification message is rendered, refer to a manner of notifying a display picture on which a notification message is rendered shown in FIG. 6. Step 600 is a start step. Step 601 is determining whether an ANDROID application is started. When the ANDROID application is not started, step 602 is performed. When the ANDROID application is started, step 603 is performed. Step 602 is not displaying a display picture. Step 603 is determining whether an application window of the ANDROID application is minimized. When the application window is not in a minimized state, step 604 is performed. When the application window is in the minimized state, step 605 is performed. Step 604 is displaying a display picture on which a notification message is rendered. Step 605 is making a prompting mark on an icon on a taskbar based on indication information.

In this embodiment of this application, the ANDROID container may intercept the notification message of the ANDROID application in the ANDROID operating system, render the notification message in the display picture of the corresponding ANDROID application, and send the display picture on which the notification message is rendered to the processor. In other words, the application window displayed by the processor includes the notification message. This improves user experience.

Figure 7:
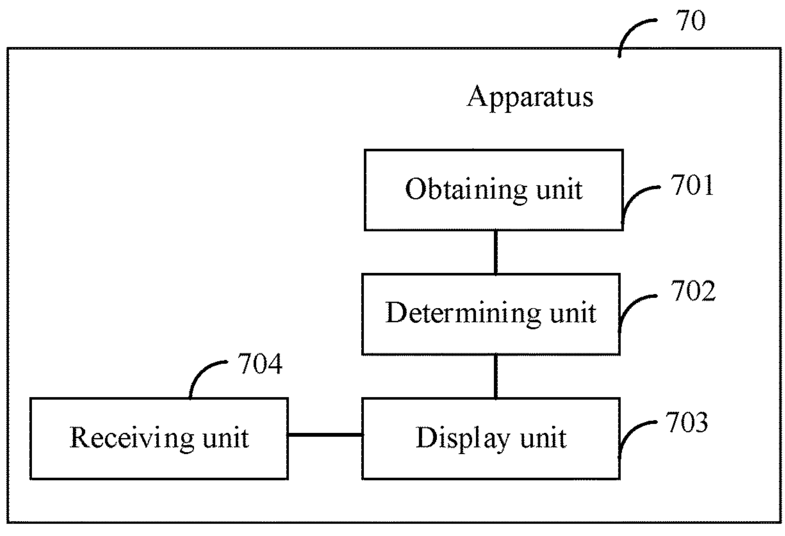
FIG. 7 is a schematic diagram of a structure of a message notification apparatus according to an embodiment of this application.
Figure 8:
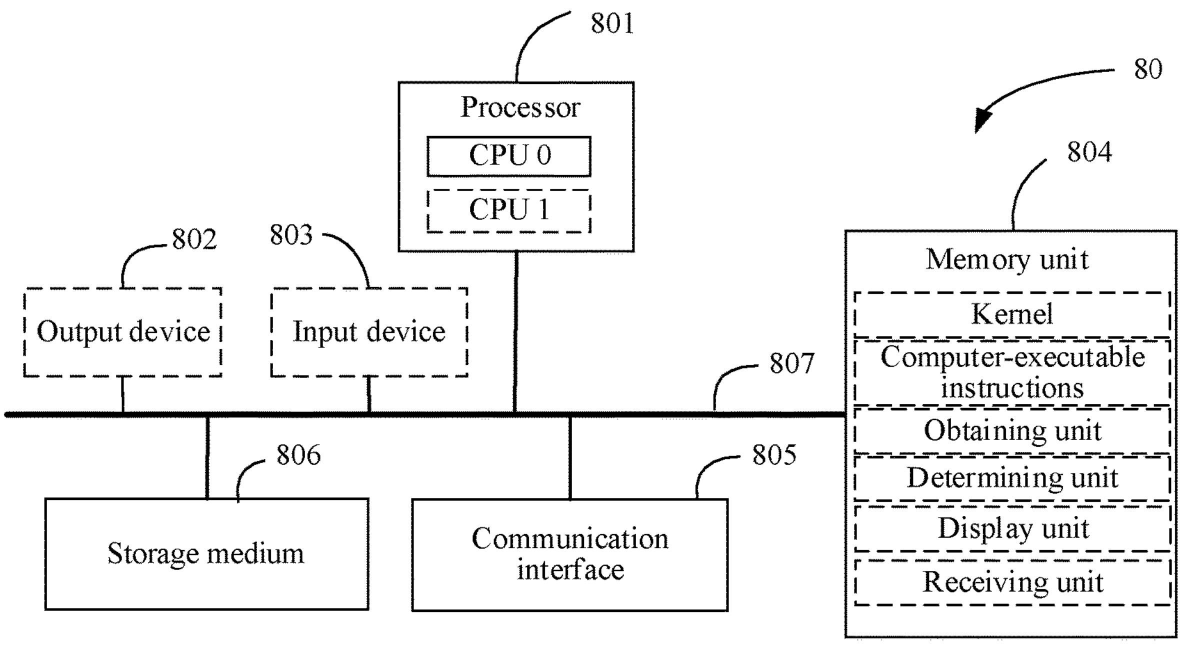
FIG. 8 is a schematic diagram of a structure of a computer device according to an embodiment of this application.

With reference to FIG. 1 to FIG. 6, the foregoing describes in detail the message notification method provided in embodiments of this application of the present disclosure. With reference to FIG. 7 and FIG. 8, the following describes a message notification apparatus and a computing device provided in embodiments of this application of the present disclosure.

FIG. 7 shows a message notification apparatus according to an embodiment of this application. The apparatus 70 includes: an obtaining unit 701, configured to obtain a notification message, where the notification message is obtained by an ANDROID operating system monitoring a message processing process of an ANDROID application, the ANDROID operating system runs in an ANDROID container, the ANDROID container is deployed in a computer device, and the ANDROID application is any application program running in the ANDROID operating system; a determining unit 702, configured to determine, based on the notification message, a state of an application window associated with the ANDROID application; and a display unit 703, configured to display the notification message based on the state of the application window.

It may be understood that the apparatus 70 in this embodiment of this application of the present disclosure may be implemented via a central processing unit (CPU), for example, a processor of an X86 architecture or a processor of an ARM architecture. Alternatively, the apparatus 70 may be implemented via an application-specific integrated circuit (ASIC) or a programmable logic device (PLD). The PLD may be a complex programmable logic device (CPLD), a field-programmable gate array (FPGA), a generic array logic (GAL), or any combination thereof. Alternatively, when the message notification methods shown in FIG. 2 to FIG. 6 may be implemented by software, the apparatus 70 and the modules of the apparatus 70 may be software modules.

Optionally, the display unit 703 is configured to display the notification message in the application window when the application window is in a display state.

Optionally, the display unit is configured to make a prompting mark on an icon of the ANDROID application on a taskbar when the application window is in a minimized state.

Optionally, the display unit 703 is further configured to: after the prompting mark is made on the icon of the ANDROID application on the taskbar, prompt, in a pop-up window on a display interface, that there is the notification message.

Optionally, the notification message is a message that experiences data filtering in the ANDROID container.

Optionally, the apparatus 70 further includes a receiving unit 704. The receiving unit 704 is configured to receive a display picture from the ANDROID container, where the notification message is rendered on the display picture.

The display unit 703 is further configured to display the display picture when the window is in the display state.

Optionally, the display unit 703 is further configured to make the prompting mark on the icon of the ANDROID application on the taskbar based on indication information when the application window is in the minimized state. The indication information is determined by the ANDROID operating system based on the state of the application window. The indication information indicates that there is the notification message in the ANDROID application.

The apparatus 70 according to this embodiment of this application of the present disclosure may correspondingly perform the methods described in embodiments of this application of the present disclosure. In addition, the foregoing and other operations and/or functions of the units in the apparatus 70 are separately used to implement corresponding procedures of the methods in FIG. 2 to FIG. 6. For brevity, details are not described herein again.

FIG. 8 is a schematic diagram of a computer device 80 according to an embodiment of this application of the present disclosure. As shown in the figure, the computer device 80 includes a processor 801, an output device 802, an input device 803, a memory unit 804, a communication interface 805, a storage medium 806, and a bus 807. The processor 801, the output device 802, the input device 803, the communication interface 805, and the storage medium 806 communicate with each other through the bus 807, or may communicate with each other in another manner, for example, through wireless transmission. The memory unit 804 is configured to store instructions, and the processor 801 is configured to execute computer-executable instructions (or referred to as program code) stored in the memory unit 804. The memory unit 804 stores program code, and the processor 801 may invoke the computer-executable instructions stored in the memory unit 804 to perform the following operations: obtaining a notification message, where the notification message is obtained by an ANDROID operating system monitoring a message processing process of an ANDROID application, the ANDROID operating system runs in an ANDROID container, the ANDROID container is deployed in the computer device, and the ANDROID application is any application program running in the ANDROID operating system; determining, based on the notification message, a state of an application window associated with the ANDROID application; and displaying the notification message based on the state of the application window.

It may be understood that, in this embodiment of the present disclosure, the processor 801 may be a CPU. Alternatively, the processor 801 may be another general-purpose processor, a digital signal processor (DSP), an ASIC, a field programmable gate array (FPGA) or another programmable logic device, a discrete gate or transistor logic device, a discrete hardware component, or the like. The general-purpose processor may be a microprocessor, or any regular processor, or the like.

The output device 802 includes a display, which may be configured to present a notification message to a user.

The input device 803 includes a device such as a keyboard or a mouse, thereby facilitating a user to provide a message or an indication for the computer device 80.

The memory unit 804 may include a read-only memory and a random access memory, and provide instructions and data for the processor 801. The memory unit 804 may further include a non-volatile random access memory. For example, the memory unit 804 may further store information about a device type.

The memory unit 804 may be a volatile memory or a non-volatile memory, or may include both a volatile memory and a non-volatile memory. The nonvolatile memory may be a read-only memory (ROM), a programmable ROM (PROM), an erasable PROM (EPROM), an electrically erasable PROM (EEPROM), or a flash memory. The volatile memory may be a random-access memory (RAM) that is used as an external cache. By way of example and not limitation, RAMs in many forms may be used, for example, a static RAM (SRAM), a dynamic RAM (DRAM), a synchronous dynamic RAM (SDRAM), a double data rate (DDR) synchronous dynamic random-access memory (DDR SDRAM), an enhanced synchronous DRAM (ESDRAM), a synchlink DRAM (SLDRAM), and a direct Rambus RAM (DR RAM).

In addition to a data bus, the bus 807 may further includes a power bus, a control bus, a state signal bus, and the like. However, for ease of clear description, all types of buses in the figure are marked as the bus 807.

For example, the bus 807 may be a Peripheral Component Interconnect Express (PCIe) bus, an Extended Industry Standard Architecture (EISA) bus, a Unified Bus (Ubus or UB), a Computer Express Link (CXL), a Cache Coherent Interconnect for Accelerators (CCIX), or the like. The bus 807 may include an address bus, a data bus, a control bus, or the like.

It may be understood that the computer device 80 according to this embodiment of this application of the present disclosure may correspond to the apparatus 70 in embodiments of this application of the present disclosure, and may correspond to corresponding bodies of the methods in FIG. 2 to FIG. 6 in embodiments of this application of the present disclosure. In addition, the foregoing and other operations and/or functions of the modules of the computer device 80 are separately used to implement corresponding procedures of the methods in FIG. 2 to FIG. 6. For brevity, details are not described herein again.

All or some of the foregoing embodiments may be implemented by using software, hardware, firmware, or any combination thereof. When software is used to implement embodiments, all or some of the foregoing embodiments may be implemented in a form of a computer program product. The computer program product includes one or more computer instructions. When the computer program instructions are loaded or executed on the computer, the procedures or functions described in embodiments of this application of the present disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, digital versatile disc (DVD)), a semiconductor medium, or the like. The semiconductor medium may be a solid-state drive (SSD).

The foregoing descriptions are example implementations of this application of the present disclosure. Any variation or replacement conceived by a person skilled in the art according to specific implementations provided in this application of the present disclosure shall fall within the protection scope of this application of the present disclosure.

What is claimed is:

1. A message notification method comprising:

monitoring a message processing process of a mobile open-source operating system (OS) application running in a mobile open-source OS of a mobile open-source OS container, wherein the monitoring comprises using an interception function of the mobile open-source OS to intercept notification messages;

obtaining, in the mobile open-source OS via the interception function, a notification message of the mobile open-source OS application while monitoring the message processing process, where the interception function forcibly stops processing of the notification message and sends it to a processor outside the mobile open-source OS container;

receiving, based on the notification message, a state table indicative of a state of an application window associated with the mobile open-source OS application on a display interface; and displaying the notification message on the display interface based on the state of the application window.

2. The message notification method of claim 1, further comprising further displaying the notification message in the application window when the state of the application window is a display state.

3. The message notification method of claim 1, wherein displaying the notification message comprises inserting a prompting mark on an icon of the mobile open-source OS application on a taskbar when the state of the application window is a minimized state.

4. The message notification method of claim 3, displaying, after inserting the prompting mark, the notification message in a pop-up window on the display interface.

5. The message notification method of claim 1, further comprising data filtering the notification message in the mobile open-source OS container.

6. The message notification method of claim 1, further comprising:

receiving a display picture comprising a rendering of the notification message from the mobile open-source OS container; and displaying the display picture when the state of the application window is a display state.

7. The message notification method of claim 1, further comprising:

determining, in the mobile open-source OS, indication information based on the state of the application window; and inserting a prompting mark on an icon of the mobile open-source OS application on a taskbar based on the indication information when the state of the application window is a minimized state, wherein the indication information indicates the notification message in the mobile open-source OS application.

8. A computer device, comprising:

a non-transitory storage medium configured to store computer-executable instructions; and a processor coupled to the non-transitory storage medium and configured to execute the computer-executable instructions to cause the computer device to:

monitor a message processing process of a mobile open-source operating system (OS) application running in a mobile open-source OS of a mobile open-source OS container, wherein monitoring the message processing process comprises using an interception function of the mobile open-source OS to intercept notification messages;

obtain, in the mobile open-source OS via the interception function, a notification message of the mobile open-source OS application while monitoring the message processing process, where the interception function forcibly stops processing of the notification message and sends it to a processor outside the mobile open-source OS container;

receive, based on the notification message, a state table indicative of a state of an application window associated with the mobile open-source OS application on a display interface; and display the notification message on the display interface based on the state of the application window.

9. The computer device of claim 8, wherein the computer-executable instructions that when executed by the processor further cause the computer device to further display the notification message in the application window when the state of the application window is in a display state.

10. The computer device of claim 8, wherein the computer-executable instructions for displaying the notification message further comprises instructions that when executed by the processor cause the computer device to insert a prompting mark on an icon of the mobile open-source OS application on a taskbar when the state of the application window is a minimized state.

11. The computer device of claim 10, wherein the computer-executable instructions that when executed by the processor further cause the computer device to display, after inserting the prompting mark, the notification message in a pop-up window on the display interface.

12. The computer device of claim 8, wherein the notification message is a message that is data filtered in the mobile open-source OS container.

13. The computer device of claim 8, wherein the computer-executable instructions that when executed by the processor further cause the computer device to:

receive a display picture comprising a rendering of the notification message from the mobile open-source OS container; and display the display picture when the state of the application window is a display state.

14. The computer device of claim 13, wherein the computer-executable instructions that when executed by the processor further cause the computer device to:

determine, in the mobile open-source OS, indication information based on the state of the application window; and insert a prompting mark on an icon of the mobile open-source OS application on a taskbar based on indication information when the state of the application window is a minimized state, wherein the indication information indicates the notification message in the mobile open-source OS application.

15. A computer program product comprising computer-executable instructions that are stored on a non-transitory computer-readable medium and that, when executed by a processor, cause a computer device to:

monitor a message processing process of a mobile open-source operating system (OS) application running in a mobile open-source OS of a mobile open-source OS container, wherein monitoring the message processing process comprises using an interception function of the mobile open-source OS to intercept notification messages;

obtain, in the mobile open-source OS via the interception function, a notification message of the mobile open-source OS application while monitoring the message processing process, where the interception function forcibly stops processing of the notification message and sends it to a processor outside the mobile open-source OS container;

receive, based on the notification message, a state table indicative of a state of an application window associated with the mobile open-source OS application on a display interface; and display the notification message on the display interface based on the state of the application window.

16. The computer program product of claim 15, wherein the computer-executable instructions that when executed by the processor further cause the computer device to further display the notification message in the application window when the state of the application window is a display state.

17. The computer program product of claim 15, wherein the computer-executable instructions that when executed by the processor further cause the computer device to insert a prompting mark on an icon of the mobile open-source OS application on a taskbar when the state of the application window is in a minimized state.

18. The computer program product of claim 17, wherein the computer-executable instructions that when executed by the processor further cause the computer device to display, after inserting the prompting mark, the notification message in a pop-up window on the display interface.

19. The computer program product of claim 18, wherein the computer-executable instructions that when executed by the processor further cause the computer device to:

receive a display picture comprising a rendering of the notification message from the mobile open-source OS container; and display the display picture when the state of the application window is a display state.

20. The computer program product of claim 15, wherein the computer-executable instructions that when executed by the processor further cause the computer device to:

determine, in the mobile open-source OS, indication information based on the state of the application window; and insert a prompting mark on an icon of the mobile open-source OS application on a taskbar based on the indication information when the state of the application window is a minimized state, wherein the indication information indicates the notification message in the mobile open-source OS application.

* * * * *